Figure 1:
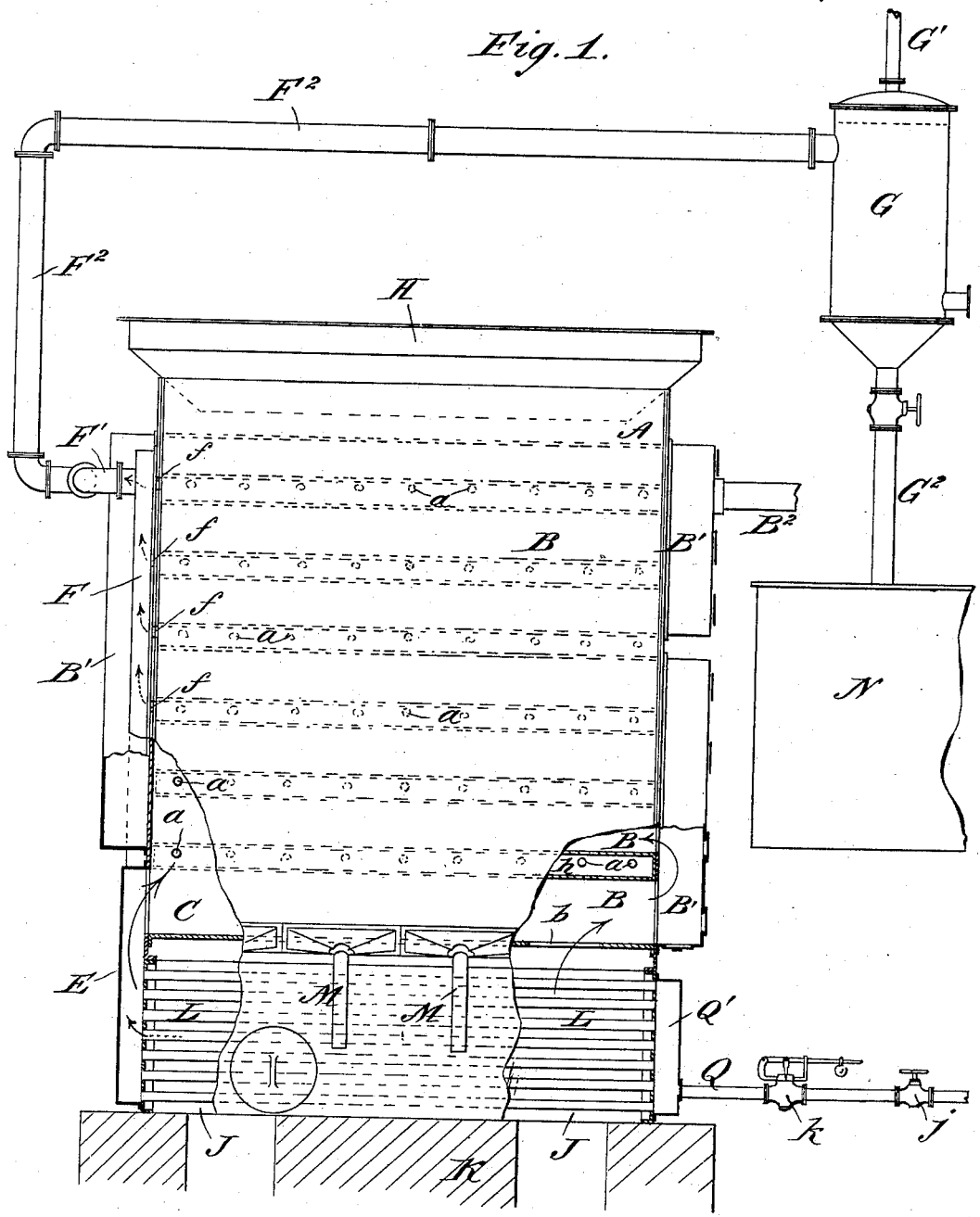

(No Model.)

E. P. EASTWICK.
BONE BLACK DRIER.

No. 320,642. Patented June 23, 1885.

2 Sheets—Sheet 1.

WITNESSES:
Dom Twitchell.
C. Sedgwick.

INVENTOR:
E. P. Eastwick
BY Munn & Co.
ATTORNEYS.

(No Model.) 2 Sheets—Sheet 2.

E. P. EASTWICK.
BONE BLACK DRIER.

No. 320,642. Patented June 23, 1885.

WITNESSES:
Dom Twitchell
C. Sedgwick

INVENTOR:
E. P. Eastwick
BY Munn & Co
ATTORNEYS.

UNITED STATES PATENT OFFICE.

EDWARD P. EASTWICK, OF NEW YORK, N. Y.

BONE-BLACK DRIER.

SPECIFICATION forming part of Letters Patent No. 320,642, dated June 23, 1885.

Application filed December 26, 1884. (No model.)

*To all whom it may concern:*

Be it known that I, EDWARD P. EASTWICK, of the city, county, and State of New York, have invented a new and Improved Bone-Black Drier, of which the following is a full, clear, and exact description.

The apparatus in common use for drying bone-black consists of a series of horizontal flues connected with a bone-black kiln, through which the waste gases of combustion leaving the kiln pass on their way to the chimney. These flues have either one or two of their sides inclined, and are arranged the one above the other in such manner that the wet bone-black entering and passing through the drier must, by its gravity, fall upon and slide over their surfaces and become heated by the gases passing through them. In order to facilitate the drying process, a current of heated air is sometimes passed through the bone-black, from which it takes up the moisture therein contained and discharges into the open air. Driers are also constructed to operate otherwise than by the direct application of heat by means of flues, and to this effect a closed tank is filled with the bone-black to be dried, through which a current of heated air or steam is forced until the moisture therein contained is partially or completely evaporated and discharged in the form of vapor into the open air.

My invention consists, in the first place, in substituting for a current of air a corresponding current of steam, in superheating the same by the waste gases of combustion from the kiln, and in forcing, by means of the current of steam, the heat thus extracted from the waste gases into and through a body of the wet bone-black, for the purpose of evaporating therefrom the moisture therein contained; in the second place, in order to further economize the heat already twice used—once in the kiln and again in the drier—in applying the heat to useful purpose a third time, and in this instance to heating water. To effect this latter object I cause the vapors emitted from the drier to be conducted to and into a condenser. This condenser may be constructed in any form known, as the "shower-condenser," or in that of the surface-condenser; or it may be a tank of water into which the vapor is forced. The latent heat of the vapor formed, and steam used, and the hot condensed water are thus preserved for heating water, and a great saving of heat is effected.

I do not confine myself to the use of the condenser, in combination with the drier, to the condensing of the vapor emitted from the bone-black by means of superheated steam only, but apply it for condensing the vapors and absorbing heat, howsoever otherwise formed and obtained, as by the agency of dry or heated air or other gases passed through the drier. The steam used may be superheated otherwise than by the waste gases of combustion from the kiln, or both the waste gases and other sources of heat may be utilized together.

Reference is to be had to the accompanying drawings, forming part of this specification, in which similar letters of reference indicate corresponding parts in all the figures.

Figures 2, 3:
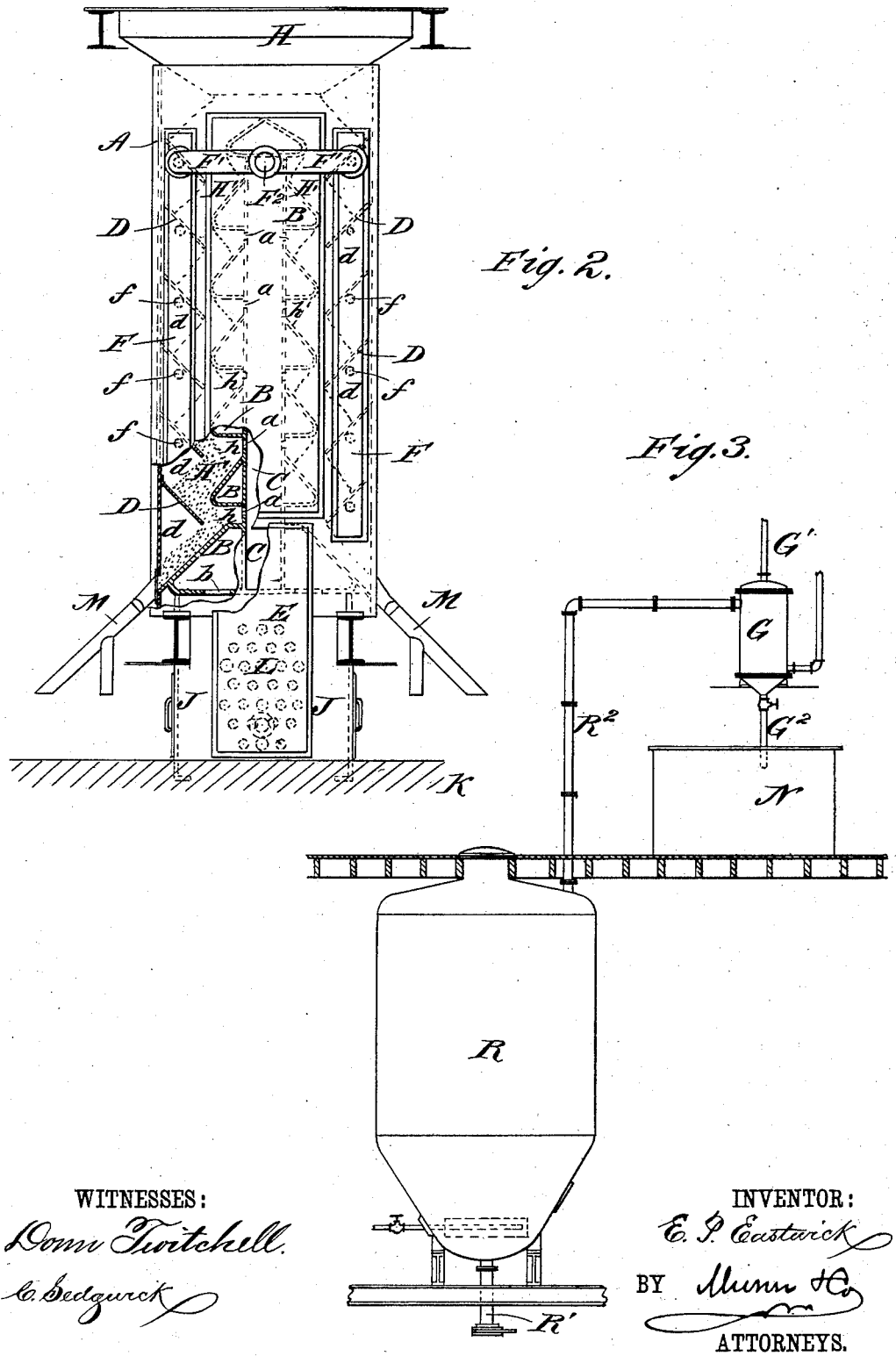

Figure 1 represents a broken side view in full lines, and a sectional elevation in dotted lines, of a bone-black drier with steam superheater, condenser, and water-tank. Fig. 2 is a broken end view in full lines, and sectional elevation in dotted lines, of the same. Fig. 3 is a side view of a tank bone-black drier, condenser, and water-tank, the drier being constructed to receive superheated steam at the bottom.

Referring more particularly to Figs. 1 and 2, which represent a drier of design and construction granted to me by Letters Patent No. 308,475, and is shown therein by Figs. 1 and 2, said drier consists of a rectangular box or tank, A, open at the top, containing double sets of horizontally-arranged flues B, connected by openings $b$ with the heating-chamber J, and inclosing and forming walls to the central main heat-passage, C, which is in connection by passage E with the heating-pipes L L.

This drier rests on the heating-chamber J, containing the pipes L L, in which steam admitted through pipe Q is superheated by the waste gases of combustion supplied to the chamber J by the kiln K.

In the walls of the central passage, C, are rows of small holes $a\,a$, which open into spaces $h$ between the flues B.

On the interior surfaces of the sides of the drier A are attached inclined projecting plates or flanges D, Fig. 2, which, in conjunction with the said sides, form passages $d$. These passages are connected by openings $f$ in the end wall of the drier with pipes F F, and these are connected by the pipes F' F' and pipe $F^2$ with the condenser G.

H is the hopper which supplies the wet bone-black to the drying-spaces H' H'.

M M are pipes at the lower part of the drier, for discharging the dried bone-black onto the kiln K.

The condenser G in this instance is a shower-condenser to which water is admitted through pipe G', and the condenser is in this instance connected by the pipe $G^2$ with tank N, which receives the heated and condensed water from the condenser G.

Instead of a drier of above-described construction, one consisting of a tank, R, formed as shown in Fig. 3, may be used, in which the superheated steam is admitted through pipe R' at the bottom, and passing through the bone-black in the drier is discharged at the top and conducted through pipe $R^2$ to the condenser.

In operation my improved bone-black drier works as follows: The wet bone-black supplied by the hopper H passes into and downward through the space H', where it is dried by the passage of superheated steam through it, and is discharged by the pipes M M onto kiln K. Steam is admitted into the heating-pipes L L through pipe Q, connected with a boiler and the casing Q'. The pipe Q is provided with the cock $j$ and pressure-regulator $k$. In passing through the pipes L the steam takes up heat from the waste gases of combustion in chamber J, in which they are inclosed, and passes thence through passages E into the central passage, C, whence it emerges through the holes $a$ $a$ into the spaces $h$ $h$; thence it forces its way through the body of the bone-black in the spaces H' into the passages $d$ $d$, and, taking up and carrying with it the moisture therein contained, passes through openings $f$ $f$ and pipes F, F', and $F^2$ to the condenser G, where the vapors are condensed and the heat saved. The products of combustion, after passing from the kiln through the chambers J, issue through opening $b$ and traverse the flues B and chambers B' B', and pass to the chimney through pipe $B^2$, the same as in the above-mentioned patent.

The advantages which my new method and improved apparatus for drying bone-black secure are a more expeditious and effectual removal of the moisture from the bone-black, a saving in fuel by retaining for the useful purpose of evaporating moisture and, subsequently, heating-water heat, which by other systems in common use is lost; and also by this method I avoid the necessity and use of a blower or other gas-forcing apparatus.

Having thus described my invention, what I claim as new, and desire to secure by Letters Patent, is—

1. The combination, with a bone-black drier, of a condenser, G, to which water is supplied through a suitable pipe, the condenser being connected with the drier by suitable pipes or conduits and with a receptacle to receive the water from the condenser, substantially as described.

2. The chamber J, containing pipes L connected with a main heat-passage arranged adjacent to the drying-passage for the bone-black, the main heat-passage being connected with the drying-passage and the latter with passages leading to the condenser, substantially as described.

3. The bone-black drier provided with side pipes, F, connected with the condenser G by suitable pipes or conduits and with the drying-chamber by openings $f$, substantially as and for the purposes set forth.

4. The bone-black drier constructed to form the horizontal triangular passages B, central passage, C, between said horizontal passages, irregular drying-passages H', and passages $d$, the latter being connected with the pipes F F' $F^2$, substantially as described.

EDWARD P. EASTWICK.

Witnesses:
H. A. WEST,
EDGAR TATE.